(12) United States Patent
Johnston et al.

(10) Patent No.: US 10,292,379 B2
(45) Date of Patent: May 21, 2019

(54) FLYING INSECT ATTRACTION STATION

(75) Inventors: Staci J. Johnston, Burnsville, MN (US); Douglas B. Gardner, Maplewood, MN (US); Thomas D. Nelson, Maplewood, MN (US)

(73) Assignee: Ecolab USA Inc., Saint Paul, MN (US)

( * ) Notice: Subject to any disclaimer, the term of this patent is extended or adjusted under 35 U.S.C. 154(b) by 764 days.

(21) Appl. No.: 13/456,452

(22) Filed: Apr. 26, 2012

(65) Prior Publication Data

US 2012/0317869 A1    Dec. 20, 2012

Related U.S. Application Data

(63) Continuation-in-part of application No. 13/160,921, filed on Jun. 15, 2011.

(51) Int. Cl.
*A01M 1/02* (2006.01)
*A01M 1/04* (2006.01)
(Continued)

(52) U.S. Cl.
CPC ............... *A01M 1/04* (2013.01); *A01M 1/00* (2013.01); *A01M 1/02* (2013.01); *A01M 1/10* (2013.01);
(Continued)

(58) Field of Classification Search
CPC .......... A01M 1/00; A01M 1/02; A01M 1/026; A01M 1/10; A01M 1/20; A01M 1/2016;
(Continued)

(56) References Cited

U.S. PATENT DOCUMENTS 947,127 A * 1/1910 Roberts ............... A47G 1/0622
40/714
1,409,114 A * 3/1922 Loveberg .................. B60T 1/10
40/715
(Continued)

FOREIGN PATENT DOCUMENTS

CH           614349 A5 * 11/1979 ............. A01M 1/02
DE         4239018 A1 * 5/1994 ............. A01M 1/02
(Continued)

OTHER PUBLICATIONS

Interior Lighting and Design; Available web site: http://interiorlightingdesignfall2009.blogspot.com/; created on Dec. 12, 2009; downloaded on Sep. 3, 2018.*
(Continued)

*Primary Examiner* — Darren W Ark
(74) *Attorney, Agent, or Firm* — McKenn, Vorhees & Sease, PLC (57) ABSTRACT

A flying insect station for attracting and killing insects on the exterior and interior of a structure is disclosed. The flying insect station includes features for attracting and killing files within a shortened window of time, preferably within one hour. The station includes in one aspect a surface being substantially dark in color and substantially reflective in nature to provide a facade of an opening. Suppression means such as a pesticide is included on one or more of the surfaces of the station for killing flying insects staging on the surface(s). An attractant may be used to provide a plume of attractant around surfaces of the housing to attract and lure flying insects to stage about a reflective surface. Increased catch rates for insect suppression devices are realized when used in combination with embodiments of the station.

16 Claims, 10 Drawing Sheets

(51) Int. Cl.
- *A01M 1/20* (2006.01)
- *A01M 1/10* (2006.01)
- *A01M 1/14* (2006.01)
- *A01M 1/00* (2006.01)

(52) U.S. Cl.
CPC .............. *A01M 1/14* (2013.01); *A01M 1/145* (2013.01); *A01M 1/20* (2013.01); *A01M 1/2005* (2013.01); *A01M 1/2016* (2013.01)

(58) Field of Classification Search
CPC .......... A01M 1/24; A01M 1/245; A01M 1/04; A01M 1/14; A01M 1/2005
USPC ....... 43/107, 122, 124, 131, 132.1, 113, 114
See application file for complete search history.

(56) References Cited

U.S. PATENT DOCUMENTS

| | | | |
|---|---|---|---|
| 2,911,756 A | 11/1959 | Geary | |
| 2,956,366 A * | 10/1960 | Wiesmann | 43/131 |
| 3,475,603 A * | 10/1969 | Gheno | F21S 9/02 40/715 |
| 3,653,145 A * | 4/1972 | Stout | 43/131 |
| 3,742,203 A * | 6/1973 | Noe | F21V 19/02 40/714 |
| 4,127,961 A * | 12/1978 | Phillips | 43/113 |
| 4,411,093 A * | 10/1983 | Stout et al. | 43/114 |
| 4,736,536 A * | 4/1988 | Doman | G09F 3/10 40/775 |
| 4,876,822 A * | 10/1989 | White | 43/113 |
| 4,918,856 A * | 4/1990 | Olive | A01M 1/145 43/113 |
| 5,018,299 A | 5/1991 | Peek et al. | |
| 5,165,783 A * | 11/1992 | Barron, Sr. | A47G 1/0622 40/714 |
| 5,205,065 A * | 4/1993 | Wilson | A01M 1/08 43/113 |
| 5,311,696 A * | 5/1994 | Gauthier | A01M 1/04 43/113 |
| 5,365,690 A * | 11/1994 | Nelson et al. | 43/113 |
| 5,501,033 A | 3/1996 | Wefler | |
| 5,505,017 A * | 4/1996 | Nelson et al. | 43/113 |
| 5,540,011 A | 7/1996 | Groom et al. | |
| 5,651,211 A * | 7/1997 | Regan et al. | 43/113 |
| 5,727,868 A * | 3/1998 | Sharma | F21S 8/00 362/147 |
| 5,775,026 A | 7/1998 | Pearce et al. | |
| 6,036,334 A * | 3/2000 | Nakano | F21V 23/04 40/714 |
| 6,108,965 A * | 8/2000 | Burrows et al. | 43/113 |
| 6,185,861 B1 | 2/2001 | Perich et al. | |
| 6,199,315 B1 * | 3/2001 | Suzue | A01M 1/04 43/113 |
| 6,438,894 B1 * | 8/2002 | Silvandersson et al. | 43/114 |
| 6,493,986 B1 * | 12/2002 | Nelson et al. | 43/113 |
| 6,625,914 B1 * | 9/2003 | Sud | B44C 5/02 40/743 |
| 6,640,476 B1 * | 11/2003 | Miller | G09F 19/18 40/715 |
| 6,916,107 B2 * | 7/2005 | Munson | F21S 8/00 362/277 |
| 6,925,750 B1 | 8/2005 | Prullage | |
| 7,066,619 B2 * | 6/2006 | Waters | F21S 8/033 40/715 |
| 7,096,621 B2 * | 8/2006 | Nelson et al. | 43/113 |
| 7,191,560 B2 * | 3/2007 | Harris | 43/113 |
| 7,270,445 B2 * | 9/2007 | Munson | F21S 8/00 362/293 |
| 7,469,499 B2 * | 12/2008 | Nelson et al. | 43/114 |
| 7,841,131 B2 * | 11/2010 | Nelson | 43/113 |
| 8,572,890 B1 * | 11/2013 | Lark et al. | 43/113 |
| 8,739,461 B2 * | 6/2014 | Studer et al. | 43/113 |
| 9,133,994 B2 * | 9/2015 | Dowdy | F21S 8/04 |
| 10,080,357 B2 * | 9/2018 | Uchida | A01M 1/04 |
| 2001/0047605 A1 * | 12/2001 | Schneider | G09F 1/12 40/757 |
| 2002/0078620 A1 * | 6/2002 | Nelson et al. | 43/113 |
| 2003/0089024 A1 * | 5/2003 | Nelson et al. | 43/113 |
| 2004/0016173 A1 * | 1/2004 | Tully et al. | 43/114 |
| 2004/0020104 A1 | 2/2004 | Feldhege et al. | |
| 2004/0025412 A1 * | 2/2004 | Simchoni et al. | 43/107 |
| 2007/0011941 A1 * | 1/2007 | Nelson et al. | 43/113 |
| 2008/0011871 A1 | 1/2008 | Sexton | |
| 2009/0288333 A1 * | 11/2009 | Johnston et al. | 43/113 |
| 2012/0317868 A1 * | 12/2012 | Johnston | A01M 1/02 43/107 |
| 2013/0318854 A1 * | 12/2013 | Zhang et al. | 43/114 |
| 2014/0059918 A1 * | 3/2014 | Lin | 43/113 |
| 2016/0345569 A1 * | 12/2016 | Freudenberg | A01M 1/04 |

FOREIGN PATENT DOCUMENTS

| | | | |
|---|---|---|---|
| DE | 10236531 A1 * | 2/2004 | A01M 1/04 |
| EP | 446464 A1 * | 9/1991 | A01M 1/02 |
| EP | 0506796 B1 | 11/1994 | |
| GB | 2333021 A * | 7/1999 | A01M 1/02 |
| GB | 2456585 A * | 7/2009 | A01M 1/14 |
| JP | 04248947 A * | 9/1992 | A01M 1/02 |
| JP | 2000004754 A * | 1/2000 | A01M 1/02 |
| JP | 2000189030 A * | 7/2000 | A01M 1/02 |
| JP | 2000287600 A * | 10/2000 | A01M 1/04 |
| JP | 2001321056 A * | 11/2001 | A01M 1/04 |
| JP | 2003102359 A * | 4/2003 | A01M 1/02 |
| JP | 2003274833 A * | 9/2003 | |
| JP | 2003339291 A * | 12/2003 | |
| JP | 2005046045 A * | 2/2005 | |
| JP | 2008154517 A * | 7/2008 | |
| JP | 2008154519 A * | 7/2008 | |
| JP | 2008167668 A * | 7/2008 | |
| JP | 2008167669 A * | 7/2008 | |
| JP | 2009118860 A * | 6/2009 | |
| JP | 2009240247 A * | 10/2009 | A01M 1/14 |
| JP | 2011067196 A * | 4/2011 | A01M 1/145 |
| JP | 2012016345 A * | 1/2012 | |
| JP | 2012024057 A * | 2/2012 | |
| JP | 2012024058 A * | 2/2012 | |
| JP | 2012110265 A * | 6/2012 | |
| JP | 2012152125 A * | 8/2012 | |
| JP | 2012239443 A * | 12/2012 | |
| JP | 2013118823 A * | 6/2013 | |
| JP | 2014096997 A * | 5/2014 | |
| JP | 2014140353 A * | 8/2014 | |
| KR | 101062764 B1 * | 9/2011 | |
| WO | 9109519 | 7/1991 | |
| WO | WO 9109519 A1 * | 7/1991 | A01M 1/02 |
| WO | WO 9622683 A1 * | 8/1996 | A01M 1/02 |
| WO | WO 2004054358 A2 * | 7/2004 | A01M 1/00 |
| WO | 2006105572 A1 | 10/2006 | |
| WO | WO 2009084900 A2 * | 7/2009 | A01M 1/145 |
| WO | WO 2010118024 A1 * | 10/2010 | A01M 1/2016 |

OTHER PUBLICATIONS

Cincinnati Arts Association, Alice F. and Harris K. Weston Art Gallery, Luminous Paintings by Tom Bacher, Dates Jan. 23-Mar. 21, 2009; Available web site: https://www.cincinnatiarts.org/weston-art-gallery/exhibitions/detail/luminous; downloaded on Sep. 4, 2018.*

Design Geek Story Teller; Available web site: http://www.angelohomeblog.com/2009/05/; created on May 31, 2009; downloaded on Sep. 3, 2018.*

Northern Lighting and Electric, Residential Lighting Electricians San Diego, Art Accent Lighting; Available web site: http://www.northernlighting.biz/residential-lighting/; downloaded on Sep. 3, 2018.*

European Patent Office, "Supplementary European Search Report", issued in connection to International Application No. 12801213.5-1655/2720535 PCT/IB2012/052097, 7 pages, dated Feb. 26, 2015.

* cited by examiner

FLYING INSECT ATTRACTION STATION

CROSS-REFERENCE TO RELATED APPLICATIONS

This application is a Continuation-in-Part of U.S. Ser. No. 13/160,921 filed Jun. 15, 2011, herein incorporated by reference in its entirety.

BACKGROUND OF THE INVENTION

Field of the Invention

This invention relates generally to a flying insect attraction station and more particularly to a device for use on the exterior or interior of a structure for attracting and killing flying insects entering the structure or residing around the exterior of the structure and within a short window of time.

Description of the Prior Art

Numerous designs of fly traps are commercially available, some use light in the form of color to attract flying insects such as flies, or the like, onto a structure or into an enclosure where they are entrapped and/or killed by a pesticide in solid or gas form. Still, these designs have proven to be only marginally effective at attracting and killing flies within a short window of time. The window of time being measured generally from the moment the fly enters an area, such as the interior or exterior area of a structure, until the fly is attracted to and killed by the suppression means.

It is therefore desirable to provide an attraction station having features that are effective at attracting and killing flying insects within a shortened window of time.

It is further desirable to provide a wall mounted attraction station for use both within and on the exterior of a structure.

SUMMARY OF THE INVENTION

In one embodiment, the invention is an attraction station for killing flying insects, such as synanthropic flies. The station includes at least one surface being substantially dark in color and substantially reflective in nature providing a facade of an opening. A pesticide is included on the surface for killing flying insects staging on the surface. In a preferred form, the station is used in combination with an attractant housing positioned generally below the surface. The housing is adapted for holding an attractant providing a plume of attractant around surfaces adjacent and above the housing. The surface is substantially black in color and includes a reflective surface selected from a group consisting essentially of a reflective laminate, a mirror, Plexiglas, reflective paint, and glass.

In another embodiment, the invention is a wall-mounted attraction station for killing flying insects. The station includes at least one generally planar reflective surface framed at least in part by a dark colored surface. At least a portion of the dark colored surface extends outward from the reflective surface to locate the portion away from the wall. A pesticide is included on one or more surfaces for killing flies staged about the reflective surface. In a preferred form, the station includes an attractant housing at least partially enclosed beneath the portion of the dark colored surface extending outward from the reflective surface for providing a plume of attractant at the dark colored surface.

In another embodiment, the attraction station includes a reflective surface providing a facade of an opening, a dark colored surface adjacent to and positioned at least partially outward from the reflective surface, and pesticide on the dark colored surface for killing the flies staged about the reflective surface. In a preferred form, the dark colored surface is a housing surrounding the reflective surface and the housing has a generally planar surface adapted for mounting the housing to a wall and orienting the reflective and dark colored surface generally vertically.

In another embodiment, the attraction station includes a generally dark colored panel having a first portion with a generally reflective surface, a second portion raised and staged about the first portion, and a pesticide on surfaces surrounding the first portion for killing flying insects staged about the first portion of the panel. The second portion may also include an attractant housing positioned generally beneath the raised second portion having an attractant for providing a plume around the second portion. The attractant housing is formed at least in part by the second portion and below the first portion of the panel.

In another embodiment, the attraction station includes a panel adapted for mounting against a wall and an outward portion of the panel having a generally vertical surface. An attractant housing is positioned below and provides a plume of attractant at the outward portion and vertical surface of the panel, and a pesticide is on at least a portion of the panel. In a preferred form, the outward portion is substantially dark in color and includes a portion of the pesticide, and the generally vertical surface is reflective.

In another aspect of the invention, a system for killing flying insects is disclosed. The system includes an insect suppression device having a housing with a light source for attracting flying insects. A surface separate from the housing and being substantially dark in color is in contact with or in generally close proximity to the insect suppression device for flying insects to stage thereon. The surface used in combination with the insect suppression device has a synergistic effect greater than if either is used alone.

In another aspect of the invention, a method for increasing the catch rate of an insect suppression device is disclosed. This is achieved in at least one way by placing an insect suppression device at a location, taking a panel being substantially dark in color and separate from the insect suppression device and positioning the panel at the location in contact with or in close proximity to the insect suppression device.

DETAILED DESCRIPTION OF THE PREFERRED EMBODIMENTS

Figure 1A:
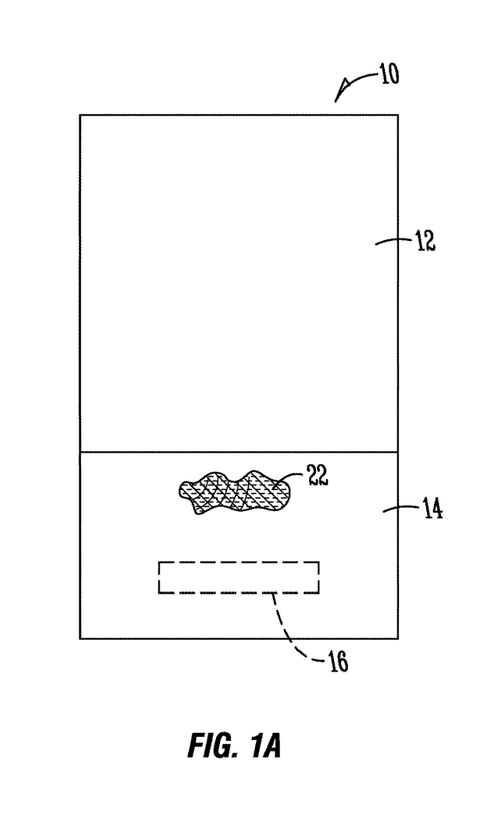
FIGS. 1A-C are illustrations of exemplary features and aspects of the present invention.
Figure 1B:
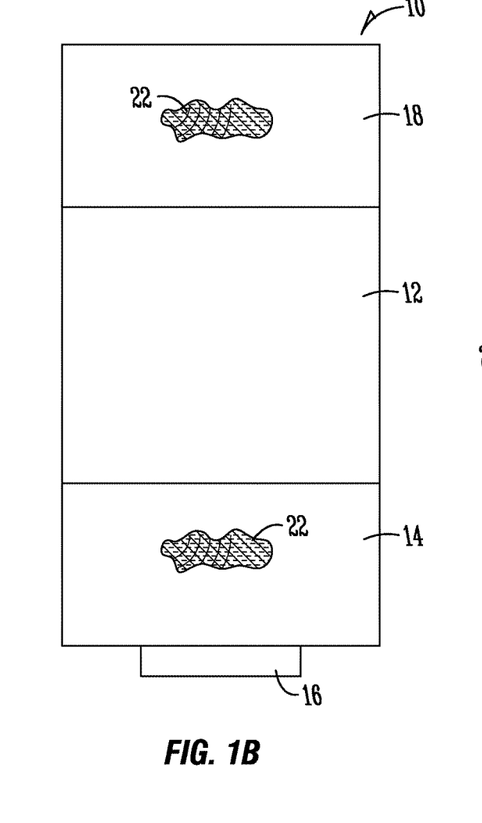
Figure 1C:
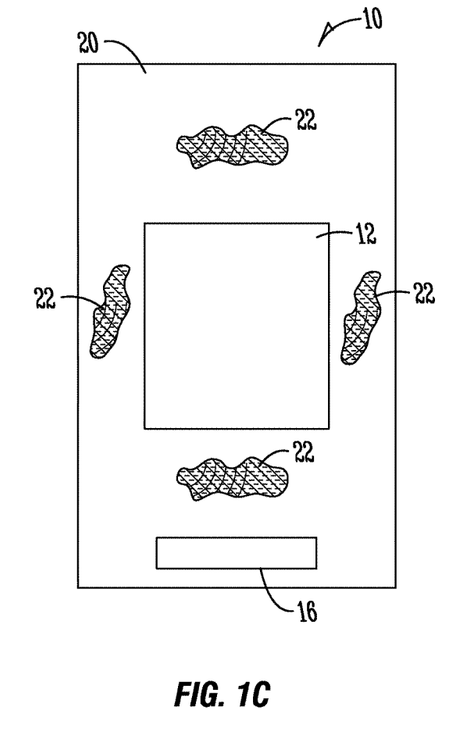

FIGS. 1A-C describe exemplary features and concepts of the present invention by illustration. The intent of the preferred embodiments of the present invention is to provide features that both attract and kill flying insects on the exterior or interior of a structure in a shortened or finite window of time. The window of time being measured generally from when the fly enters an area, such as the interior or exterior area of the structure, and until the fly is attracted to and killed by the attraction station.

Exemplary features and aspects of the present invention for attracting and killing flying insects, such as synanthropic flies, fruit flies, filth flies, etc., within a shortened window of time are illustrated in FIGS. 1A-C. For example, FIG. 1A illustrates an exemplary embodiment of a flying insect station 10 of the present invention. The flying insect station 10 includes a first panel 12 which is generally planar and has a surface configuration to provide some reflectivity, preferably specular reflectivity. To provide the reflectivity requirement of the first panel 12, the first panel 12 is comprised of a reflective material providing specular reflection. Reflective materials for example include Plexiglas, glass, a mirror, reflective paint, reflective films/laminates, etc. Other materials and surfaces providing specular reflection are also contemplated by the present invention. The first panel 12 is also generally planar, and due to the reflectivity of the surface provides a facade of an opening or a hole. Both laboratory and field studies conducted at various locations indicated that flies were attracted to and landed near openings, holes, entrances, and exits that lead to potential breeding sources. Both male and female flies were observed to be found at openings on the ground in front of an opening and on edges and surfaces inside and outside openings. Thus, the reflective surface of the first panel 12 provides a facade of an opening or hole to attract and lure flying insects to stage about the first panel 12.

Figure 4:
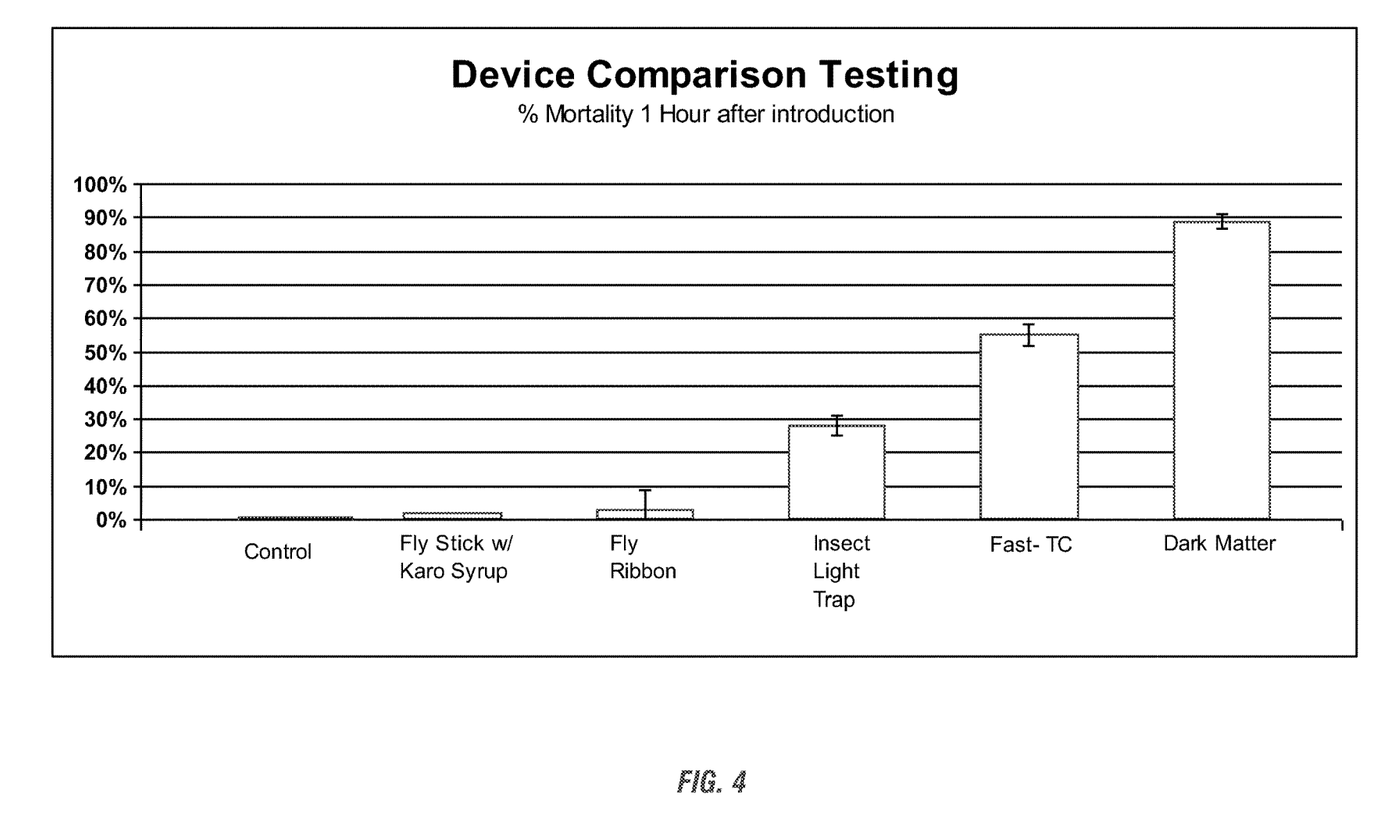
FIG. 4 is a bar chart illustrating the effectiveness of various flying insect traps after one hour of elapsed time.

The first panel 12 may also be configured so as to be wall mountable. On the wall, the first panel is oriented vertically or parallel with the wall. The first panel 12 may include some depth to raise the surface of the first panel 12 from off of the mounting surface such as a wall. A second panel 14 is used in combination with the first panel 12. The second panel 14 provides a surface for flying insects to stage about the first panel 12. The first and second panel 12 and 14 may be integral components or separate panels mountable adjacent one another. The second panel 14 may include a depth sufficient to raise the surface of the second panel 14 out away from a mounting surface such as a wall. The depth of the second panel 14 may exceed the depth of the first panel 12 so that the surface of the second panel extends further outward from the mounting surface than the surface of the first panel 12. The first and second panel 12 and 14 may also be configured with generally equivalent depths so that the surface of the first panel 12 and the surface of the second panel 14 occupy generally the same plane. The second panel 14 may be hollow through its depth or include an enclosed cavity beneath the surface. The surface of the second panel 14 is preferably dark in color. In one embodiment, the surface of the second panel 14 is substantially black, preferably gloss or high gloss. Both field and laboratory research indicated that dark objects placed near an entrance or opening to a structure proved successful in attracting flies onto the surface of the second panel 14 to stage about the first panel 12, where the surface of the first panel 12 has a facade of an opening or hole. Studies indicated that the close proximity of a dark colored surface near an entrance or opening became a preferred base location where flies would frequent the area resulting in predictable landing sites. As further illustrated by FIG. 4, dark colored or matter devices were more effective at attracting and achieving higher mortality rates in a short window of time than other fly suppression devices.

As illustrated in FIGS. 1B and 1C, the configuration of the flying insect station may be altered so that a third panel 18, similar to the second panel 14, is positioned above the first panel 12. The second panel 14 and third panel 18 provide additional space for flying insects to locate or stage about the first panel 12. Similarly, the flying insect station 10 shown in FIG. 1C illustrates a fourth panel design 20 which generally surrounds the first panel 12, similar to a frame, to provide sufficient space for flying insects to locate and stage about the first panel 12. Research and studies conducted in laboratory and field environments indicated that flies, particularly male flies, space themselves out on surfaces depending upon the number of flies in the area. To provide the optimal spacing in busier or congested areas of the panel, additional surface area is provided in the embodiments illustrated in FIGS. 1B and 1C. Variations on the amount of surface area of the first and second panel 12 and 14 illustrated in FIG. 1A are contemplated as shown by FIGS. 1B and 1C. The second and third panels 14 and 18 in FIG. 1B may be configured integrally with the first panel 12 or separate from the first panel 12. The collection of panels may be free-standing or mounted on a mounting surface such as a wall so that the second panel 14 and third panel 18 are positioned adjacent to and/or around the first panel 12. Similarly, FIG. 1C may be configured so that the fourth panel 20 surrounding the first panel 12 is integrally connected or separate components. In the embodiments illustrated in FIGS. 1A-1C, one or more of the panels may be configured to be replaceable, refreshable, serviceable, or replenishable. In the broadest sense, the configuration of the flying insect station 10 illustrated in FIGS. 1A-1C illustrates how two contrasting surfaces, such as the surfaces of the first and second panel 12 and 14 shown in FIG. 1A, provide an attraction mechanism for attracting synanthropic flies to land and stage about the first panel 12.

Each of the flying insect stations 10 illustrated in FIGS. 1A-1C may include additionally an attractant 16. Studies and research conducted at laboratories and field environments indicated that the odors associated with fly breeding materials were an important element for attracting and achieving staging of flies about an opening or entrance. The attractant 16 may be a separate and replenishable component of the flying insect station 10. The attractant 16 may be positioned in a cavity behind the outer surface of the second panel 14 as illustrated in FIG. 1A. Depending upon the depth of the second panel 14, a cavity or housing may be formed beneath the surface for receiving an attractant 16. Alternatively, the attractant 16 may be housed within a housing that is either integrally configured with the other components of the flying insect station 10 or removably attached when in use and removed when not in use or when needing replenished. The attractant 16 or the housing holding the attractant 16 may be positioned at a location below the second panel 14 as illustrated in FIG. 1B or on the surface of the second panel 14 as illustrated in FIG. 1C. Preferably, the attractant 16 is positioned relative to the second panel 14 in FIG. 1A, the second panel 14 in FIG. 1B, and the fourth panel 20 in FIG. 1C so that the plume from the attractant source surrounds or resides adjacent staging surfaces of the flying insect station 10 around or about the first panel 12.

Figure 5:
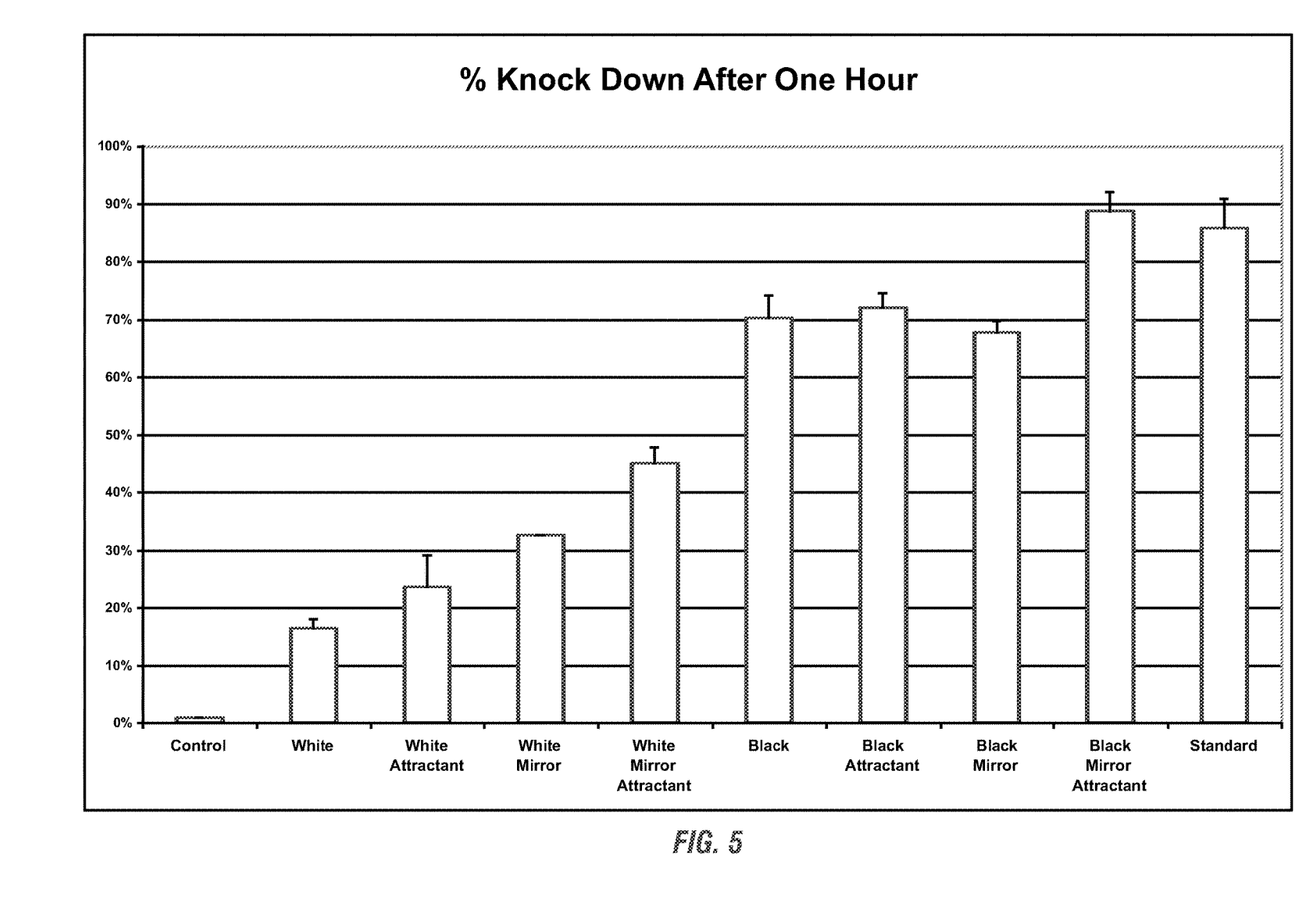
FIG. 5 is a bar chart illustrating the knock down effectiveness of various features of the present invention after one hour of elapsed time.

The attractant 16 may be protected by a housing or by the cavity within the flying insect station 10 where the attractant is placed. Placement within a housing or within a cavity or enclosure of the flying insect station 10 helps protect the attractant 16 for use of the flying insect station 10 outdoors. The attractant 16 is preferably a type of media that the fly perceives as food or breeding material, typically includes high moisture content to provide the creation of an attractant plume rising up from the source to surrounding edges and surfaces of the flying insect station 10. Various types of attractants are commercially available. Of the available attractants, the present invention contemplates at least the use of media such as organic decaying material that has a high moisture content to provide water vapor and includes a perfume or odor to attract flying insects, such as synanthropic flies. Studies and research indicate as shown in FIG. 5 that the combination of the above features, namely a first panel 12 having a reflective surface, a second panel 14 having a dark colored surface and an attractant achieve a high percent of knockdown of the flies within one hour of elapsed time.

The odor producing matrix of the attractant 16 could be in solid or liquid form. Either form could be configured so as to be replenishable or refreshable as needed. The attractant 16 could be a serviceable feature of the station 10. Preferably, the attractant 16 consists of an odor producing matrix that flying insects find attractive and that sustains the production of odor for an extended period of time, such as for example, up to a month or more. Attractant 16, as indicated above, includes water as a part of the matrix formulation. The water component could be metered as an additive over time to refresh or replenish the production of odor.

Additional features of the flying insect station 10 illustrated in FIGS. 1A-1C include suppression means such as a pesticide (e.g., an insecticide) and/or bait applied to one or more surfaces of the flying insect station 10. The suppression means 22 illustrated in FIGS. 1A-1C may be a serviceable component of the flying insect station 10. The suppression means may be in a solid, semi-solid, semi-viscous or liquid form; the suppression means also may be in a gaseous form which is dispensed into the air at or nearby the panels of the flying insect station 10. The suppression means may be a contact insecticide, such as those permissible for use in the food service industry or other industries where the types of available suppression means that can be used are limited by industry specific regulations. The suppression means preferably provides an immediate effect upon the subject fly, such as killing the fly within the desired 60 minute window. The suppression means also preferably has a residual affect that last up to 30 days or more. The suppression means may be replaceable or replenishable, such as where the suppression means comprises a serviceable component of the flying insect station 10. The suppression means 22 may be applied to one or more surfaces of the flying insect station, preferably surfaces where flies congregate or stage about the first panel 12. The suppression means 22 may be applied by spray coating one or more surfaces of the flying insect station 10. The suppression means 22 may also be brushed onto or wiped onto one or more of the surfaces of the flying insect station 10. The suppression means 22 is preferably a long-lasting, slow release contact pesticide, specifically a surface pesticide for indoor or interior use. The effectiveness of the suppression means 22 may be preserved up until actual implementation and use of the flying insect station 10. For example, a peel-away or peel-off outer covering may be used to seal and protect the suppression means 22 until the flying insect station 10 is put into operation. The suppression means 22 may be an integral component of the flying insect station 10 or a separate component that is replaceable or replenishable without replacing the entire flying insect station 10. For example, the suppression means 22 may have a residual affect lasting 30 days and upon the expiration of the 30 day period is replaced with a new suppression means.

In another aspect of the present invention, the suppression means 22 may include a bait portion incorporated into the pesticide formulation or applied on top of the pesticide treatment. The bait is preferably a food source or feeding stimulant, such as sugar, that causes a fly to extend its proboscis and attempt to feed. Bait is an optional component, but it is known that bait enhances the rapidity of the pesticide by stimulating ingestion. Surfaces of the flying insect station 10 including the suppression means 22, may include a tacky or adhesive characteristic to increase the time of contact. In a preferred aspect of the present invention, the suppression means 22, such as a pesticide, includes a bait, such as sugar, so that when the fly lands on one or more of the coated surfaces of the flying insect station 10 the taste receptors on the feet of the fly recognize the presence of sugar and the fly open its proboscis to feed. The reaction causes the fly to ingest the pesticide that is mixed with the sugar, resulting in rapid death.

Figure 6:
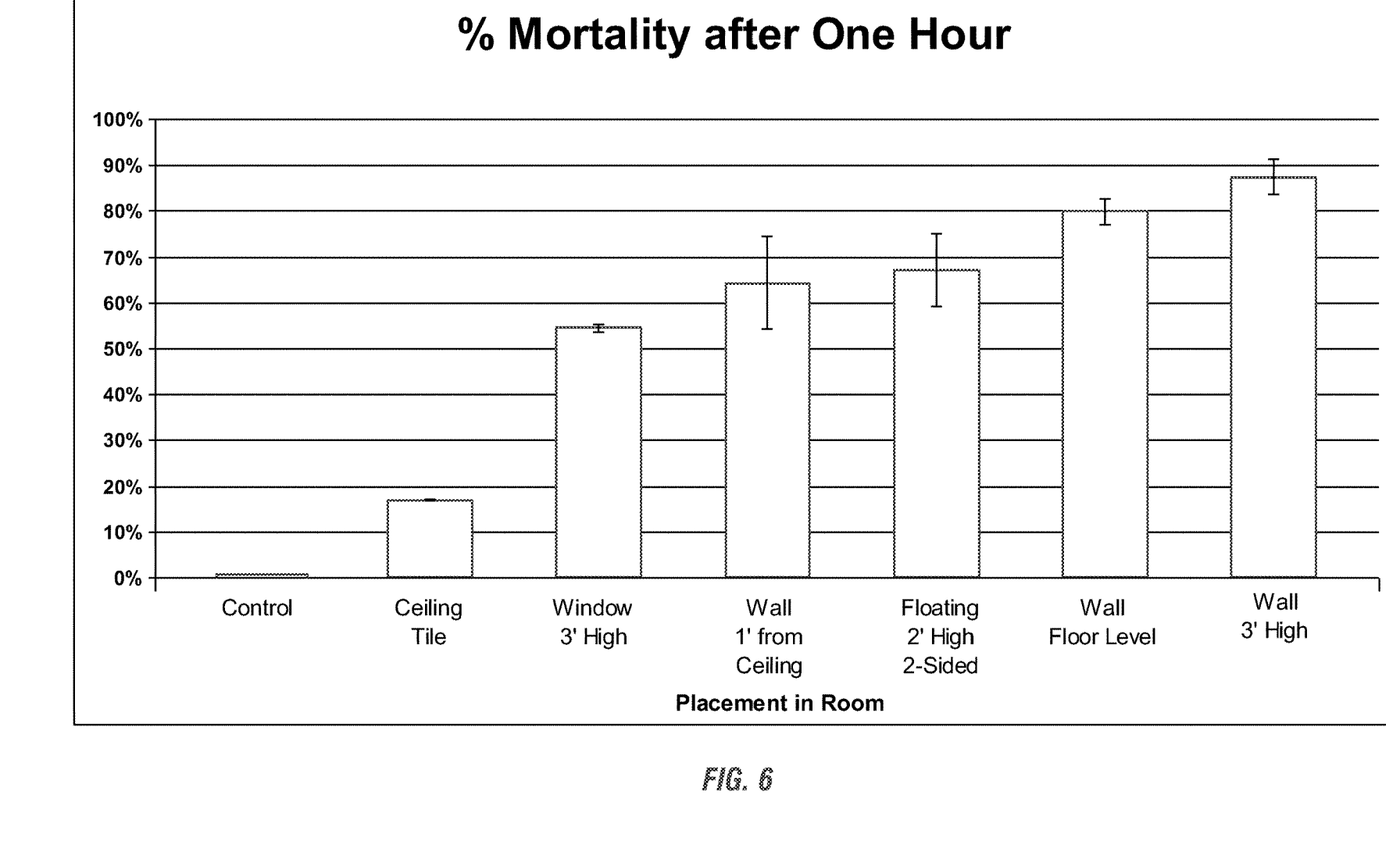
FIG. 6 is a bar chart illustrating the mortality effectiveness after one hour depending upon placement of the station.

The flying insect station 10 illustrated in FIGS. 1A-1C is preferably configured so as to be mountable on a vertical surface such as a wall whereby at least the first panel 12 is oriented vertically or parallel with the wall, and spaced a distance from the wall. The mounting surface or wall is preferably a solid surface. FIG. 6 illustrates the mortality effectiveness after one hour of exposure to the flying insect station 10 based on placement of the station 10 within a room. In a preferred embodiment of the present invention, the flying insect station 10 is placed at a vertical position on a wall generally 1 to 3 feet or 1 to 8 feet from the floor. Horizontal placement of the flying insect station 10, such as on a ceiling, does not result in the desired effectiveness and is not a preferred mounting configuration for the flying insect station 10.

Each of the features addressed above provide a cumulative affect for attracting and killing flying insects within a finite window of time. Some features are more effective than others for attracting flies to stage about the first panel within a short time period. FIG. 5 illustrates the effectiveness of various contemplated and exemplary features of the flying insect station 10. For purposes of example only, a control was used having a black panel with a white attractant tube including a measured amount of aged media. The control did not include a pesticide, and exhibited very little effectiveness at killing flies within a one hour window of exposure. Tests indicated as shown that a white panel with an attractant was marginally more effective than a white panel only. A white panel, reflective surface such as a mirror and an attractant was at least 10% better than a white panel in combination with a reflective surface such as a mirror. A flying insect station that included a black surface whether in combination with an attractant or a reflective surface such as a mirror showed measurable improvements over those previously discussed. A flying insect station that included a black colored surface, a reflective surface such as a mirror and an attractant proved to be most effective at knocking down the highest percentage of flies within a one hour window of time. A pesticide was used as a common feature in the various examples illustrated in FIG. 5 for providing suppression. Further studies and research indicated that the features identified above were most effective at attracting and luring a fly into staging about one or more surfaces of the flying insect station surrounding or adjacent the first panel such as a reflective surface for common fly behaviors (e.g., annoyance, breeding, darting/chasing, low exploratory flight, mid-level exploratory flight, and leaving behaviors).

Figure 2:
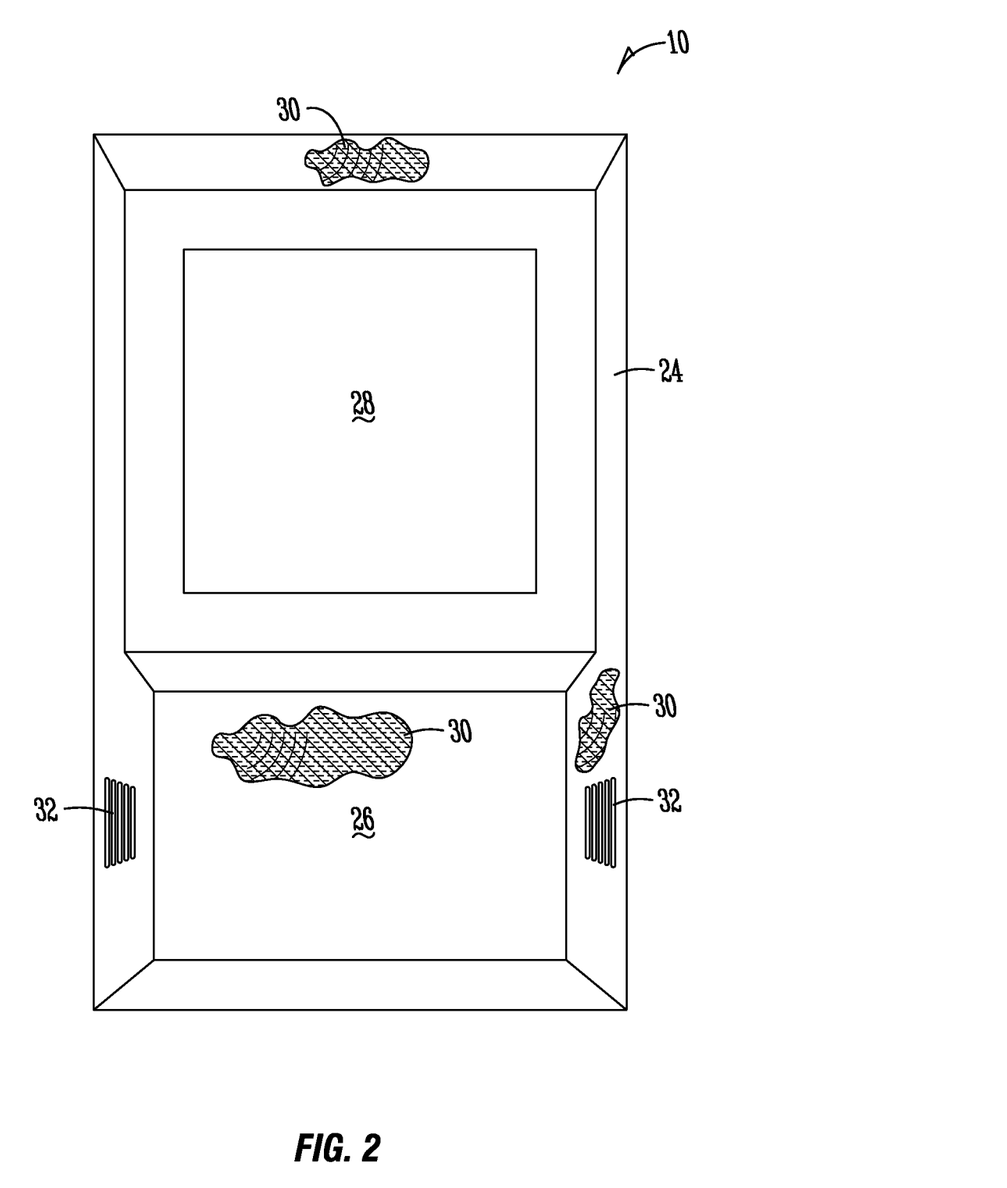
FIG. 2 is a front elevation view of an attraction station in accordance with an exemplary embodiment of the present invention.
Figure 3:
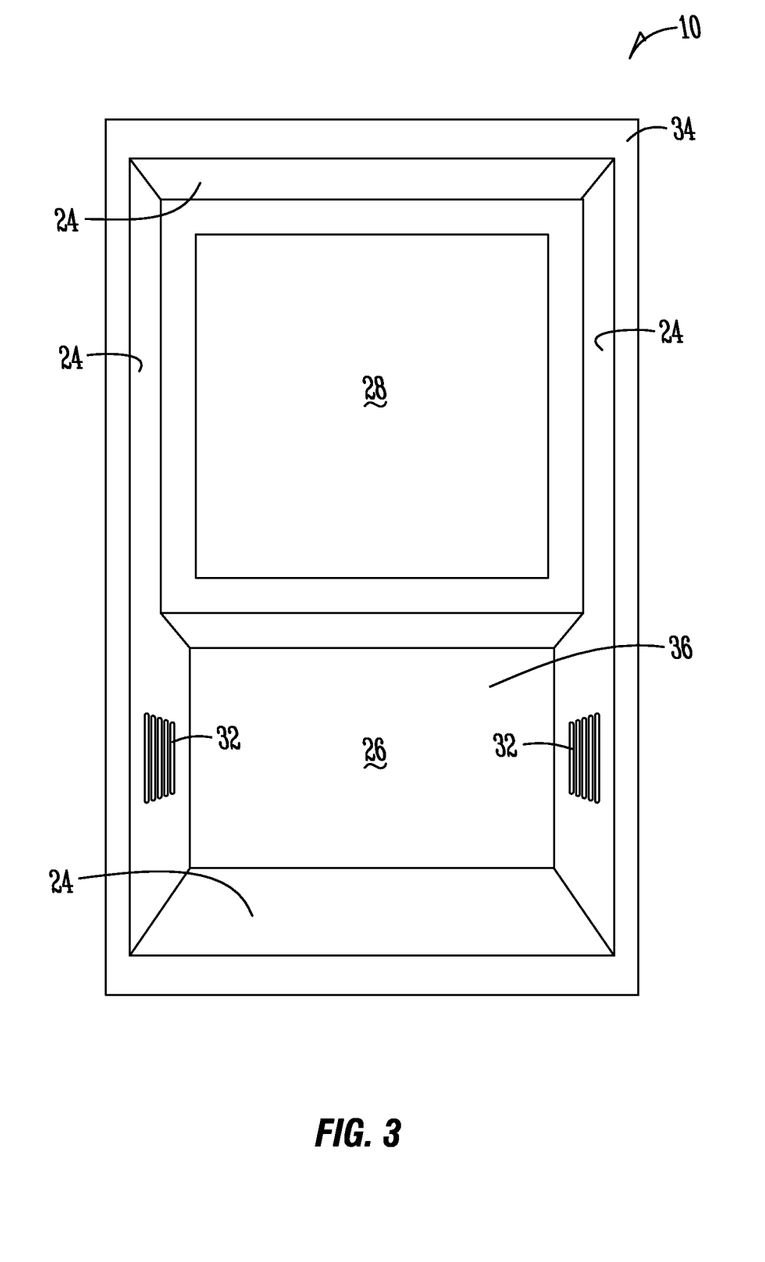
FIG. 3 is a rear elevation view of the station illustrated in FIG. 2.

FIGS. 2-3 illustrate another exemplary embodiment of flying insect station 10 of the present invention. FIG. 2 shows a front side elevation view and FIG. 3 shows a backside elevation view of the flying insect station 10. The flying insect station 10 includes a frame portion 24 having a generally inwardly tapered surface and providing depth to the flying insect station 10. The surface geometry of the frame 24 may be tapered, rounded, planar or another desired geometry. The backside of the frame includes an outer peripheral edge 34 (illustrated in FIG. 3) that is generally planar or resides in a single plane. The edge 34 allows the flying insect station 10 to be placed flush against a vertical surface such as a wall. The frame 24 provides depth between the wall and other surfaces of the flying insect station 10. The flying insect station 10 includes a first surface 26 extending outward from the outer peripheral edge 34 above the second surface 28. The frame 24 and first surface 26 are preferably a dark color, such as black. A cavity 36 is configured on the backside beneath the first surface 26 as best illustrated in FIG. 3. The cavity 36 may include means for supporting or holding an attractant, such as the attractant 16 illustrated in FIGS. 1A-1C. The attractant, as previously discussed, may be a serviceable, replenishable, refreshable, or a consumable portion of the flying insect station 10. One or more surfaces of the flying insect station 10, such as surfaces adjacent the first surface 26, may include a vent 32 to allow a plume of attractant to surround surfaces adjacent and above the cavity 36. The second surface 28 is preferably a reflective surface similar to those discussed above. One or more of the outer surfaces of the flying insect station 10 may include a suppression means 30, such as a pesticide for killing flying insects staging about the first surface 26 on the second surface 28 or frame 24. Like the attractant, the suppression means 30 may be a replenishable, refreshable, surfaceable or consumable portion of the flying insect station 10. The outer peripheral edge 34 of the flying insect station 10 orients the first surface 26 and second surface 28 generally vertically relative to the mounting surface, such as a wall. In addition to being wall-mountable, the station 10 may be configured as a free-standing device.

As discussed above, the flying insect station 10 may be used without an attractant or the attractant may be a separate component of the flying insect station 10, such as a free standing component placed or mounted near the flying insect station 10. The flying insect station 10 may be constructed of economically viable material so as to allow the entirety of the flying insect station 10 to be a consumable and replaceable with a new one after the effectiveness of the suppression means and/or attractant have lost their residual effects. The flying insect station illustrated in FIGS. 2-3 may include one or more of the features discussed above, alone or in combination with each other, integral to or separated from one another. For example, the first surface 26 may be a separate component from the second surface which is a separate component from the suppression means and/or the attractant. The flying insect station 10 is preferably configured in a panel or frame geometry with one or more of the features of the station being replenishable, refreshable, serviceable or replaceable with a new component. The flying insect station 10 may be configured for either indoor or outdoor use. For example, indoor applications often require compliance with industry specific regulations. Both attractants and suppression means approved for indoor use, such as in the food service industry or other applicable industries, may be used with the flying insect station 10 as described above. These features allow the placement of the flying insect station 10 at or near entrances, windows or where flies accumulate or congregate due to one or more of the behaviors identified above or the presence of food or breeding materials. The flying insect station 10 may also be configured for outdoor use by including a stronger attractant, increasing the size of the device and/or configuration of the geometry of the device so as to protect the attractant and/or suppression means from exposure to weather and other outdoor elements. The materials used to configure the flying insect station 10 may also be weather resistant, UV and heat resistant. In some outdoor environments, breeding or attracting grounds exist where the flying insect station 10 may be placed, such as for example without the use of an attractant, for attracting flies to one or more surfaces of the flying insect station 10 within a shortened window of time for providing fly suppression.

Figure 7:
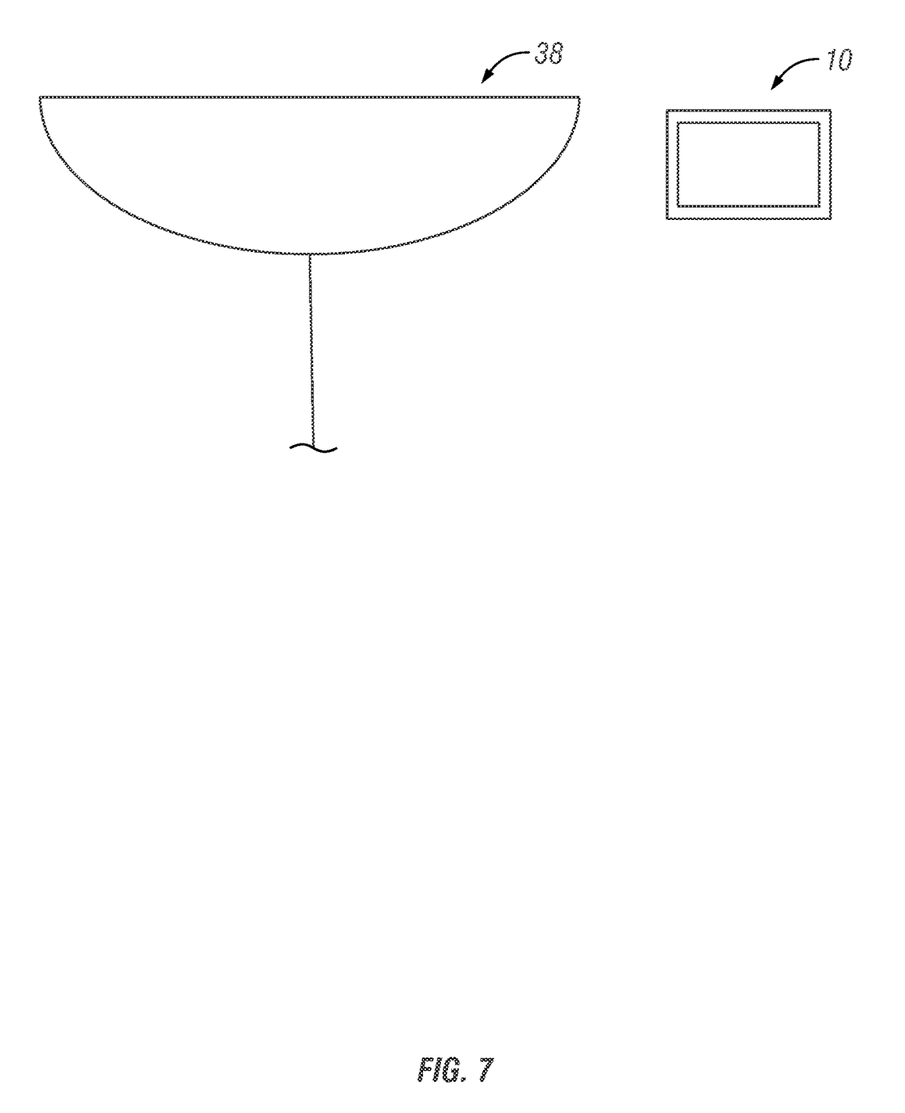
FIG. 7 is an illustration of another exemplary aspect of the present invention.

FIG. 7 illustrates another exemplary aspect of the present invention. FIG. 7 illustrates a flying insect station 10 such as those previously illustrated. The station 10 may be configured in the form of a panel which is preferably dark in color (e.g., black). As noted above, the station may include a reflective portion integrated into the panel or as a separate component to the panel. The reflective portion provides specular reflection providing the facade of an opening or a hole. The arrangement of the panel and reflective portion may be configured as previously described. The station 10 may also be configured as a panel alone without a reflective portion. The panel may take on various shapes and sizes and is preferably dark in color (e.g., black). The station 10 may also include in addition to a reflective portion and attractant, for example placed within a housing, cavity or enclosure, for providing an attractant plume rising up around the staging areas of the station 10. The station 10 is placed, mounted near, attached to or otherwise placed in proximity to suppression means 38. According to an exemplary aspect of the invention, the suppression means 38 is a fly suppression device such as an insect trap utilizing ultraviolet ("UV") light in combination with a long-lasting, slow release contact pesticide, such as a surface pesticide. The combination of the fly attraction station 10 used in conjunction with a suppression device such as an insect light trap may be used on the interior or exterior of the structure. The use of a fly attraction station 10 in combination with a suppression device such as an insect light trap increases the catch rate of the light trap. Observations were made of individual flying insect behavior after they were released into a new environment that led to this conclusion, Specifically, the initial behavior of a flying insect during the first hour after release is categorically definable. These include, as discussed above, behaviors such as resting (e.g., sitting in one place without flying for 10 minutes or more), low exploring (e.g., slow flight within one foot from the floor), mid-exploring (e.g., flight between one and six feet from the floor), leaving (rapid flight, usually at a more rapid pace and usually more than six feet from the floor), darting/chasing (predominantly male fly behavior attempting to mate with female flies as they fly by. Male fly stage on surfaces near fly-ways and dart after passing flies), breeding (predominantly female fly behavior in and on possible breeding material), and annoyance (fly behavior based near and/or on humans in the area).

When a flying insect is first released into a new area, there is usually a period of acclimation where the fly stays close to the release point and begins to explore surrounding areas. Introduced flies may also establish a temporary "base" from which they explore their surroundings. A base is a general area that a fly will leave from when exploring and return to at the end of the exploratory flight. Annoyance behavior is when the base is a human and the fly repeatedly lands on or near the human, even when the human moves to a new location. Exploratory flight is not necessarily random. When flying, exploring flies appear to be attracted to dark objects and surfaces. Flies fly towards dark objects, repeatedly near dark objects, and around dark objects. Flies actively explore openings and dark, recessed areas. Flies actively fly to where movement, such as human activity, is found. Resting sites are also not necessarily random. Flies tend to prefer resting locations with broad views. They may land more often on dark surfaces, but this is not necessarily a significant trend or general rule, Tests of the station and fly suppression device such as an insect light trap shown in FIG. 7 were conducted, According to one aspect of the invention, elements, such as a panel, having a dark color (e.g., black) are used in combination with a fly suppression device such as an insect light trap within a flight room.

Figure 8:
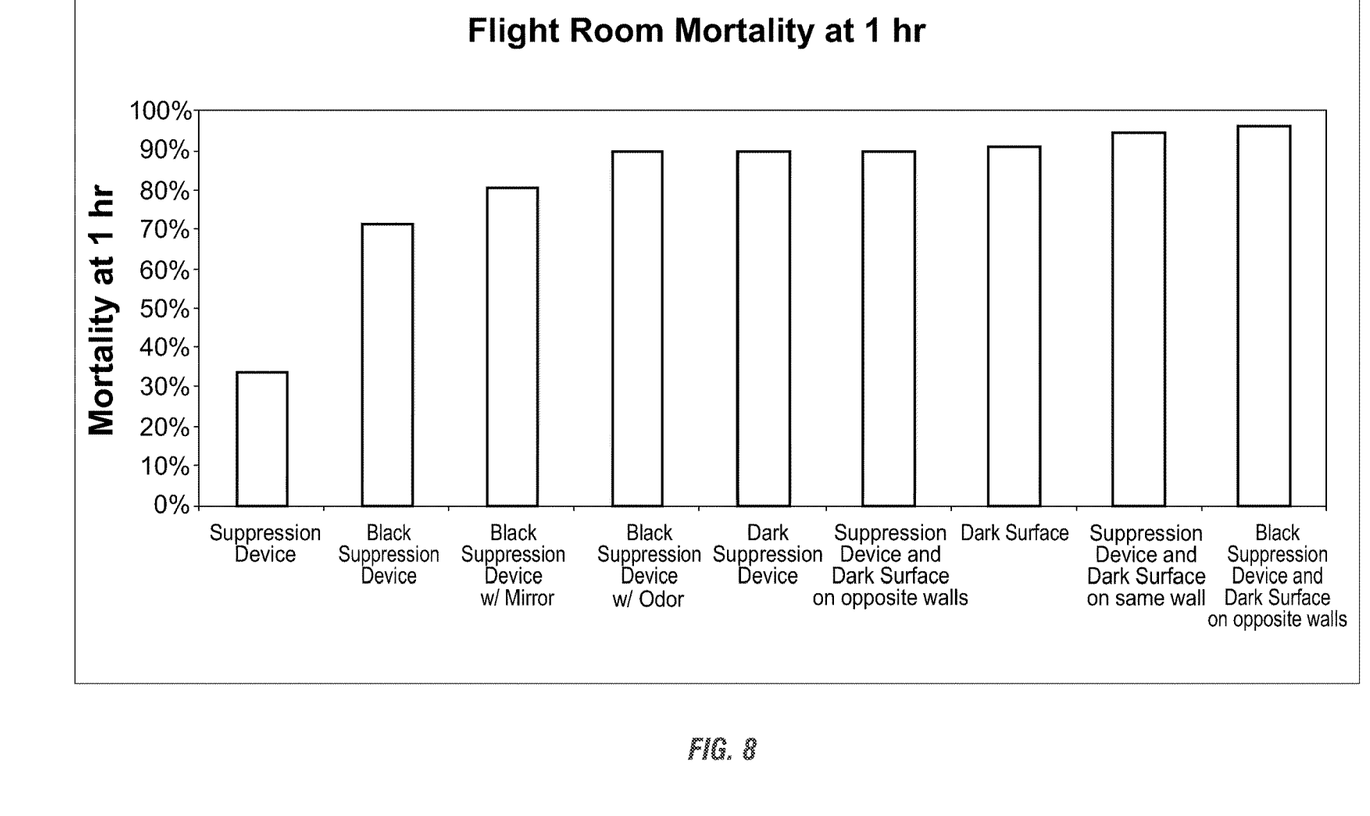
FIG. 8 is a bar chart illustrating the mortality effectiveness after one hour of another exemplary embodiment of the present invention.

FIG. 8 illustrates a bar chart evidencing the increased catch rate that was observed with the addition of a dark color in the vicinity of the fly suppression device. The first two bars on the chart shown in FIG. 8 illustrate the increase in catch rate, which nearly doubles, when the shroud of the insect light trap is a dark color such as black compared to one that is not. The mortality percentages at one hour continue to increase when a fly suppression device that is dark in color is used with a reflective surface such as a mirror or used in combination with an attractant such as an odor. The subsequent bars in the chart shown in FIG. 8 show a high mortality occurring within a one hour period for instances of use where a dark panel was used in combination with a fly suppression device such as an insect light trap. Thus, a dark element such as the dark colored station 10 illustrated in FIG. 7 in combination with a fly suppression device whether located near, attached to, or otherwise placed in proximity to the fly suppression device shows an increased mortality rate within the one hour period shown in FIG. 8.

Figure 9:
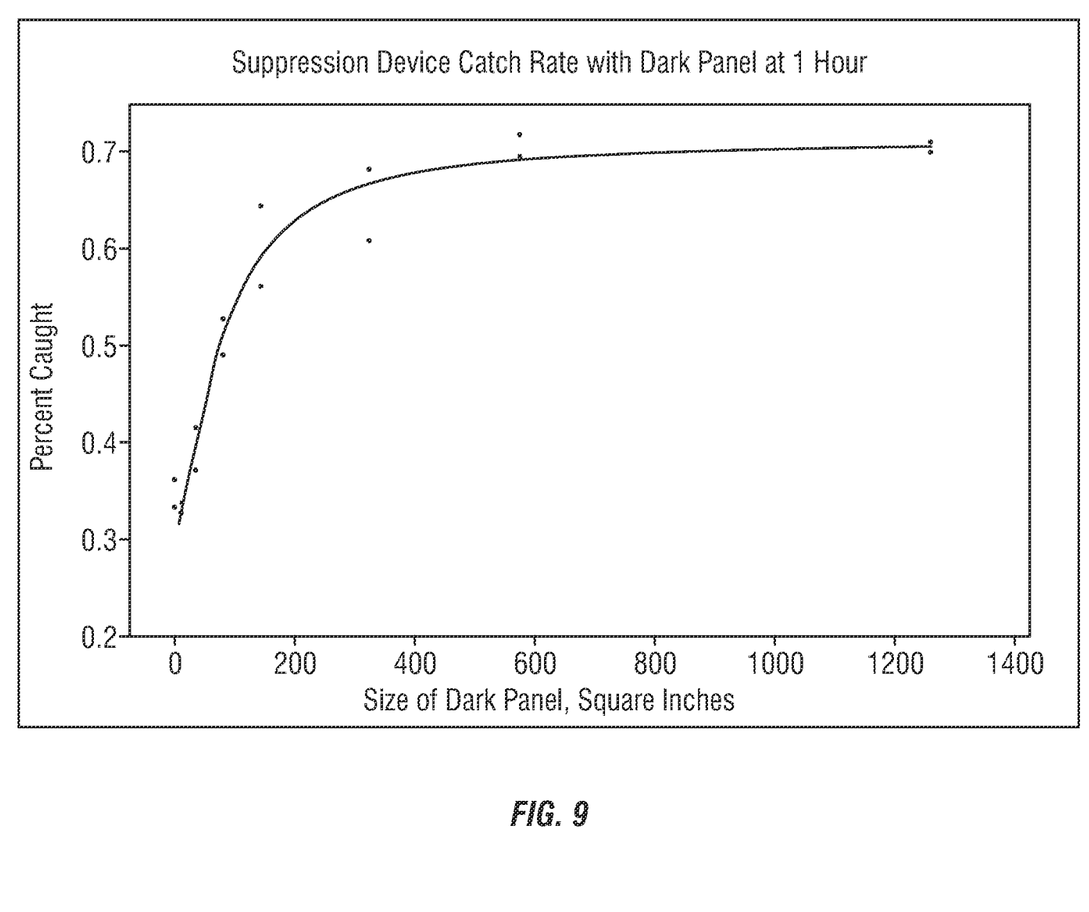
FIG. 9 is a plot illustrating the catch rate change resulting from a variation of the panel size.
Figure 10:
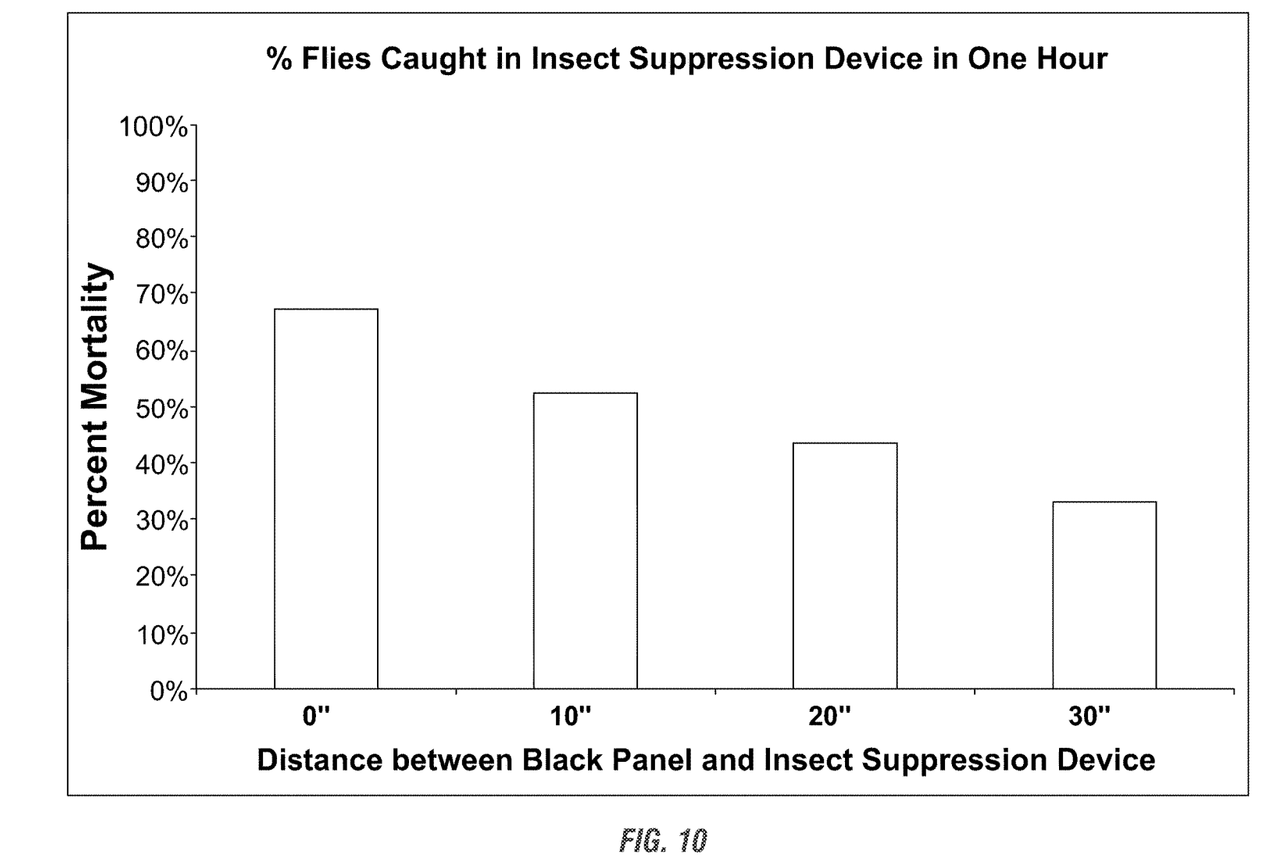
FIG. 10 is a plot illustrating the mortality rate change resulting from a variation of the distance between the panel and suppression device.

The present invention contemplates that the panel as part of the station 10 illustrated in FIG. 7 may be configured in various sizes and shapes. Preferably, the panel is mountable on a vertical surface such as a wall, ceiling or floor. Laboratory tests were conducted to determine the optimal size of a dark panel placed in proximity to a fly suppression device such as an insect light trap, and the results are shown in the plot illustrated in FIG. 9. The plot shows a significant increase in the catch rate in the light trap as the surface area of the panel is increased, at least up to a surface area of roughly 400 square inches. Thus, catch rates did not show any significant increase for dark panel surface areas in excess of 400 square inches. Laboratory tests were also conducted to determine how close the station 10 should be positioned relative to the fly suppression device. FIG. 10 illustrates the results from a dark panel having a surface of roughly 432 square inches used at varying distances relative to a fly suppression device such as an insect light trap. The percentage of flies caught by the fly suppression device within one hour decreases by nearly half as the distance between the dark panel and the station increases up to 30 inches. The highest effectiveness by percent mortality is realized by placement of the fly suppression device next to or attaching it to the panel of the station 10 shown in FIG. 7. Thus, the results show that a dark color panel such as the station 10 shown in FIG. 7 placed in close proximity to a fly suppression device such as an insect light trap can significantly impact catch rates. Even a dark color panel having a size of 10 inches by 10 inches, for example, can significantly increase catch rates when used in combination with a fly suppression device such as an insect light trap.

While the flying insect station 10 here and before described is effectively adapted to fulfill the aforementioned objectives, it is to be understood that the invention is not intended to be limited to the specific preferred embodiments of the aspects disclosed and set forth above. Rather, it is to be taken as including all reasonable equivalents to the subject matter of the appended claims.

What is claimed is:

1. A system for killing flying insects comprising:
an insect suppression having a housing comprising a light source for attracting flying insects, said light source positioned at least partially within one or more walls forming the housing, said one or more walls extending from a mounting wall to shroud the light source with the light source being positioned substantially within an area defined by the mounting wall and the one or more housing walls such that the mounting wall and the one or more housing walls forming a partially enclosed area for the light source;
a single, substantially planar surface separate from the insect suppression device and being positioned against and substantially parallel to the mounting wall near but unconnected to the insect suppression device to create an illusion that the surface is part of the mounting wall, wherein the surface being substantially unobstructed to create the illusion that the surface is part of the mounting wall, and the surface being substantially dark in color and in generally close proximity to the insect suppression device for flying insects to stage thereon, and wherein said surface not including a light source; and
an attractant housing positioned at the surface;
said surface being a color darker than and in contrast to the housing and the mounting wall to which the device and surface are mounted;
wherein the light source of the insect suppression device is not directed towards the surface; and
wherein the surface in combination with the insect suppression device have a synergistic effect greater than if used alone.

2. The system of claim 1 wherein the surface includes a reflective portion for providing a facade of an opening.

3. The system of claim 2 wherein the surface surrounds the reflective portion akin to a frame.

4. The system of claim 1 wherein the insect suppression device includes a pesticide.

5. The system of claim 1 wherein the insect suppression device includes an attractant.

6. The system of claim 1 wherein the surface includes a pesticide for killing flying insects staging on the surface.

7. The system of claim 1 wherein the surface is substantially black.

8. The system of claim 1 wherein the surface forms a portion of a wall-mounted panel.

9. A system for killing flying insects comprising:
an insect suppression device having a housing comprising a light source for attracting flying insects, said light source positioned at least partially within one or more walls forming the housing, said one or more walls extending from a mounting wall to shroud the light source with the light source being positioned substantially within an area defined by the mounting wall and the one or more housing walls such that the mounting wall and the one or more housing walls forming a partially enclosed area for the light source; and a substantially planar panel separate from the insect suppression device, the panel being substantially unobstructed and being substantially dark in color and having a reflective portion for providing a facade of an opening;

the panel in generally close proximity to and being positioned against and substantially parallel to the mounting wall near but unconnected to the insect suppression device to comply with the mounting wall so as to form a part of the mounting wall for flying insects to stage thereon; and said panel being a color darker than and in contrast to the housing and the mounting wall to which the device and surface are mounted;

wherein said panel not including a light or heat source;

wherein the panel and/or the insect suppression device include a pesticide;

wherein the light source of the insect suppression device is not directed towards the panel; and wherein the panel in combination with the insect suppression device have a synergistic effect greater than if used alone.

10. The system of claim 9 wherein the panel and/or insect suppression device include an attractant.

11. The system of claim 9 wherein the reflective portion is surrounded at least in part by the panel.

12. A method for increasing a catch rate of an insect suppression device, comprising:

placing an insect suppression device at a location, said insect suppression device comprising a housing comprising a light source for attracting flying insects, said light source positioned at least partially within one or more walls forming the housing, said one or more walls extending from a mounting wall to shroud the light source with the light source being positioned substantially within an area defined by the mounting wall and the one or more housing walls such that the mounting wall and housing walls forming a partially enclosed area for the light source;

taking a substantially planar panel not including a light source and being unobstructed and substantially dark in color and separate from the insect suppression device, said panel including at least a portion being darker than and in contrast with both the insect suppression device and the mounting wall adjacent the device and panel and also being substantially planar;

using a pesticide with the panel and/or insect suppression device; and positioning the panel at a location against and substantially parallel to the mounting wall near but unconnected to the insect suppression device so as to form an illusion that the panel is part of the mounting wall and wherein the light source of the insect suppression device is not directed towards the panel.

13. The method of claim 12 comprising increasing the catch rate using a synergistic effect from the panel used in combination with the insect suppression device.

14. The method of claim 12 comprising emitting ultraviolet light from the light source of the insect suppression device.

15. The method of claim 12 wherein the panel provides a visual attractant for insects to stage about the insect suppression device.

16. The method of claim 12 comprising positioning an attractant at the panel and/or insect suppression device.

* * * * *

UNITED STATES PATENT AND TRADEMARK OFFICE
CERTIFICATE OF CORRECTION

PATENT NO. : 10,292,379 B2
APPLICATION NO. : 13/456452
DATED : May 21, 2019
INVENTOR(S) : Staci J. Johnston, Douglas B. Gardner and Thomas D. Nelson Page 1 of 1

It is certified that error appears in the above-identified patent and that said Letters Patent is hereby corrected as shown below:

On the Title Page

(74) Attorney, Agent, or Firm:
DELETE "McKenn, Vorhees & Sease, PLC"
INSERT --McKee, Voorhees & Sease, PLC--

(57) Abstract, Line 3:
DELETE "files" after "killing"
INSERT --flies-- after "killing"

In the Claims

In Column 10, Claim 1, Line 18:
INSERT --device-- after suppression

Signed and Sealed this
Third Day of September, 2019

Andrei Iancu
*Director of the United States Patent and Trademark Office*